United States Patent [19]

Terai et al.

[11] Patent Number: 4,887,099

[45] Date of Patent: Dec. 12, 1989

[54] SUBSTRATE FOR AN INK JET RECORDING HEAD HAVING ELECTRODES FORMED ON A GLAZE LAYER, AND A RECORDING HEAD AND APPARATUS USING THE SUBSTRATE

[75] Inventors: Haruhiko Terai, Yokohama; Yasutomo Watanabe, Hiratsuka, both of Japan

[73] Assignee: Canon Kabushiki Kaisha, Tokyo, Japan

[21] Appl. No.: 174,383

[22] Filed: Mar. 28, 1988

[30] Foreign Application Priority Data

Mar. 27, 1987 [JP] Japan .................................. 62-71720
Mar. 25, 1988 [JP] Japan .................................. 63-69680

[51] Int. Cl.[4] .......................... G01D 15/16; B41J 3/04
[52] U.S. Cl. ................................................ 346/140 R
[58] Field of Search .......................... 346/140, 76 PH

[56] References Cited

U.S. PATENT DOCUMENTS 4,686,544 8/1987 Ikeda .................................. 346/140
4,723,129 2/1988 Endo .............................. 346/140 X

*Primary Examiner*—Joseph W. Hartary
*Attorney, Agent, or Firm*—Fitzpatrick, Cella, Harper & Scinto

[57] ABSTRACT

A substrate for an ink jet recording head comprises a support member, an electro-thermal converter, disposed on the support member, having a heat generating resistive layer and a pair of electrodes connected to said heat generating resistive layer, and a glaze layer on the support member underneath the electro-thermal converter. The glaze layer is omitted from between a heat generating portion provided by the resistive layer between a gap in the electrodes so that the heat generated by such heat generating portion can be properly dissipated.

33 Claims, 3 Drawing Sheets

SUBSTRATE FOR AN INK JET RECORDING HEAD HAVING ELECTRODES FORMED ON A GLAZE LAYER, AND A RECORDING HEAD AND APPARATUS USING THE SUBSTRATE

BACKGROUND OF THE INVENTION

1. Field of the Invention

This invention relates to a substrate for an ink jet recording head, an ink jet recording head and an ink jet recording apparatus provided with the recording head.

2. Related Background Art

As the support member of an ink jet recording head, use has heretofore been made of an Si support member, a glass support member or a support member of ceramics such as alumina.

An Si support member poses no problem in terms of its performance, but it is difficult using present-day techniques to manufacture, for example, an Si wafer which copes with the elongation or bulkiness of a recording head corresponding to the length of a side of recording paper of size A3 or A4 (Japanese standard), and it has also suffered from the problem of high cost. A glass support member has bad heat conductivity and therefore accumulates heat therein if the head drive frequency is increased, and insoluble matter can precipitate from recording liquid, and sometimes it becomes impossible to discharge the recording liquid. A ceramics support member, in the manufacturing process thereof, is liable to cause surface defects (i.e., surface defects such as pin-holes or projections of several μm to several tens of μm) which are very difficult to find by visual inspection or microscopic inspection and cannot be detected until films on the defects come off after film formation, and thus many defects occur during the film formation.

Also, with the ceramic support member, it is difficult to obtain a mirror surface having surface roughness of several tens of Å or less, and usually they are used with a glaze layer provided on the whole of one surface thereof. This has sometimes led to the problem that the glaze layer cannot be made thinner than in the manufacture 40–50 μm in the manufacture and therefore, as in the glass support member, it has sometimes led to the problem of heat accumulation.

SUMMARY OF THE INVENTION

The present invention has been made in order to solve the above-noted problems, and an object thereof is to provide a substrate for an ink jet recording head and an ink jet recording head in which a heat radiating property necessary to carry out good recording (heat radiation effected in order that liquid may not be unnecessarily heated by heat energy not used for recording to give rise to said problems) is secured and occurrence of surface defects can be minimized to thereby suppress the production of defective products during film formation and in addition, which can cope with the elongation and bulkiness of the head, and an ink jet recording apparatus provided with such recording head.

DESCRIPTION OF THE PREFERRED EMBODIMENTS

Some embodiments of the present invention will hereinafter be described in detail with reference to the drawings.

Figure 1:
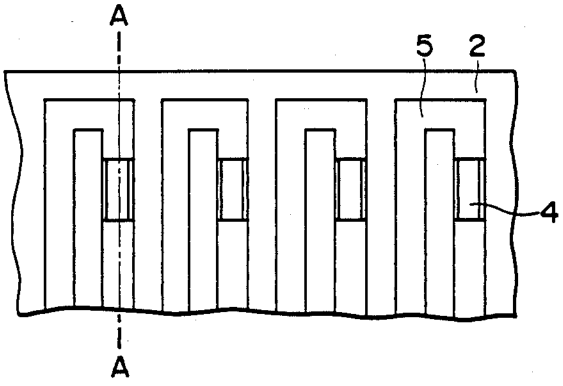
FIGS. 1 and 3 are schematic plan views each showing an embodiment of the substrate for the ink jet recording head of the present invention.
Figure 2:
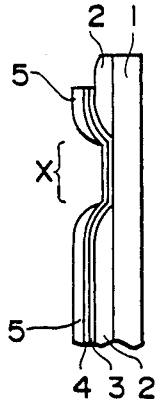
FIG. 2 is a schematic cross-sectional view of the substrate for the ink jet recording head of FIG. 1 taken along line A—A' of FIG. 1.

FIG. 1 is a schematic plan view showing the characteristic portion of a preferred embodiment of the substrate for the ink jet recording head of the present invention, and FIG. 2 is a schematic cross-sectional view taken along line A—A' of FIG. 1. In this substrate for the ink jet recording head, a glaze layer 2 having an aperture in the form of a window is laid on a support member 1, and a heat accumulating layer 3 and a heat generating resistance layer 4 are layered so as to be disposed at least on that portion of the support member 1 on which the glaze layer 2 is absent (the unglazed portion). A pair of electrodes 5 are connected to the heat generating resistance layer 4 so that a current can be supplied to the latter. That is, in this substrate for the ink jet recording head, the heat generating resistance layer 4 on the unglazed portion forms a heat generating portion which is a portion generating heat energy available to discharge ink.

In such a substrate for the ink jet recording head, the heat conduction in the direction of thickness of a portion X on which said heat generating portion is formed can be suitably determined by the heat accumulating layer 3 whose desired thermal characteristic can be chosen by the selection, for example, of a material (for example, an inorganic oxide such as $SiO_2$) and thickness. Therefore, according to the present embodiment, a good heat radiation property can be secured in the portion X, and the problem of heat accumulation as previously described does not arise. Moreover, since the glaze layer 2 covers most of the support member 1 and buries any surface defects therein, there can be obtained a mirror surface. Therefore, little or no defect occurs to the film formed and defects in film formation are reduced very much. That is, the heat generating portion of an electro-thermal converting member formed on the support member 1 and having a heat generating resistance layer and a pair of electrodes connected to the heat generating resistance layer does not occupy a large area if viewed from the area of the entire support member (or the area of the portion of the support member on which at least the electro-thermal converting member is provided) and therefore, the reduction in yield caused by the defective region of the support member can eventually be decreased sharply.

Figure 3:
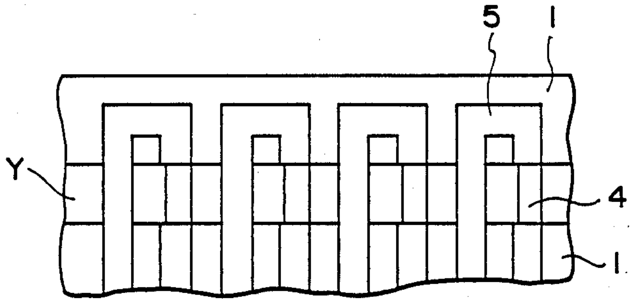

Another embodiment of the present invention is shown in FIG. 3. In this substrate for the ink jet recording head, an unglazed portion Y, including electrodes 5 between adjacent heat generating portions, is provided in the form of a band. That is, below some of the electrodes 5, there are also locations in which the glaze layer 2 is not layered. In this case, the case with which the recording head is manufactured is improved. These embodiments should be chosen by balancing the requirement for the operational improvements afforded by said improved radiation property and smoothness with the ease and cost with which the recording head is manufactured.

In the present invention, it will suffice if the glaze layer 2 does not substantially exist at least in the portion X on which the heat generating portion is formed, and there are no special limitations in the size of the heat generating resistance layer 4, the connected state of the electrodes 5 and the heat generating resistance layer 4, the material of each portion, etc., and the heretofore known factors may safely be used. For example, the heat generating resistance layer 4 may be of a size substantially equal to the size of the portion X in which the heat generating portion is formed. However, in view of the problems enumerated with regard to the prior art, a ceramic material such as $Al_2O_3$, SiC or AlN may be mentioned as a suitable material of the support member.

Also, in the present invention, it is preferable that the heat accumulating layer 3 is present as described above, but depending on the characteristic or the like of the material of the support member, the heat accumulating layer 3 may be omitted. Further, in the present invention, a protective layer may of course be provided on the upper surface or the like of the portion X in which the heat generating portion is formed.

To form the glaze layer 2 partly on the support member 1 during the manufacture of the substrate for the ink jet recording head of the present invention, utilization can be made of a selective coating method using screen printing, a method of carrying out selective etching after the coating of the glaze layer 2, or the like. The heat accumulating layer 3 and the heat generating resistance layer 4 may be formed by a known method. As regards the heat accumulating layer 3, it may be formed on the support member 1 before the glaze layer 2 is formed on the support member 1. That is, the heat accumulating layer 3 may be provided between the support member 1 and the glaze layer 2.

In order to form the glaze layer according to the invention, conventional materials for a fused glass layer or glaze layer may be used.

Such a glaze layer has an average composition as follows.

| | |
|---|---|
| $SiO_2$ | 50–68 wt % |
| BaO | 5–18 wt % |
| $Al_2O_3$ | 5–13 wt % |
| others | rest |

The following may be used to form the glaze layer.

GS-2, GS-3, GS-5 (Kyocera Corporation)

GS-8, G-21, XG-903 (Nippon Tokushu Togyô Corporation)

HKG-1052 (Hitachi Chemical Corporation)

Figure 4:
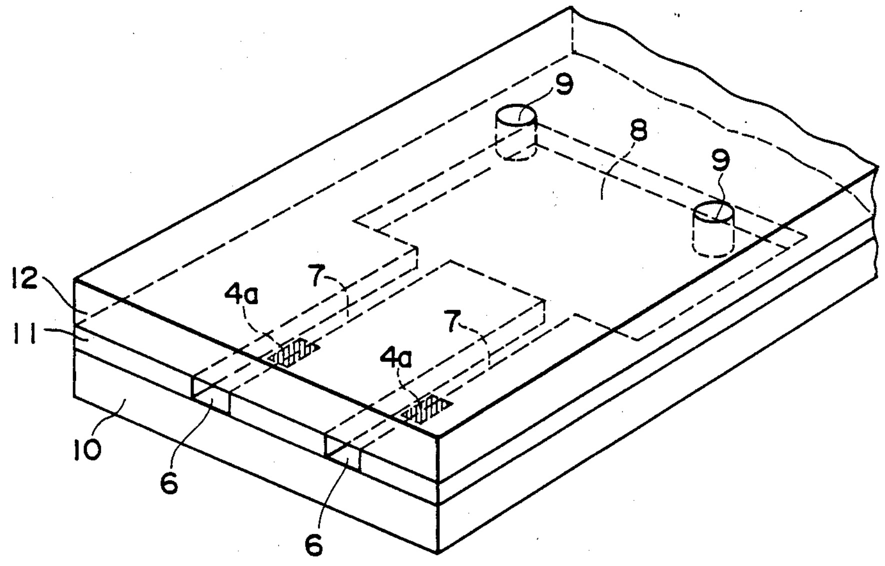
FIG. 4 is a schematic perspective view showing an example of the essential portion of the ink jet recording head of the present invention.

An essential portion of the ink jet recording head of the present invention is of such structure as shown, for example, in FIG. 4. The recording head shown in FIG. 4 is provided with discharge ports 6 for discharging liquid and causing the liquid to fly as liquid droplets, liquid paths 7 communicating with the discharge ports 6, heat generating portions 4*a* which are portions provided in the liquid paths 7 and generating energy available to discharge the liquid and cause the liquid as liquid droplets, a liquid chamber 8 communicating with the liquid paths 7, and supply ports 9 for supplying the liquid to the liquid chamber 8.

In the ink jet recording head shown in FIG. 4, the direction in which the ink is discharged from the discharge ports and the direction in which the ink is supplied from the liquid chamber to the liquid paths are substantially parallel to each other, but this is not restrictive in the present invention. The present invention may be, for example, an ink jet recording head of the type in which said two directions are substantially perpendicular to each other.

Figure 5:
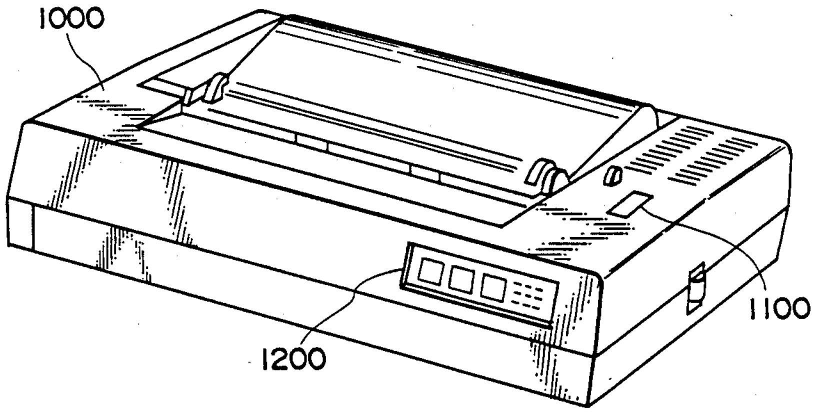
FIG. 5 is a schematic perspective view of an ink jet recording apparatus provided with the ink jet recording head according to the present invention.

FIG. 5 is a schematic perspective view of an ink jet recording apparatus carrying thereon the aforedescribed ink jet recording head according to the present invention. In FIG. 5, the reference numeral 1000 designates the body of the apparatus, the reference numeral 1100 denotes a main switch, and the reference numeral 1200 designates an operating panel.

EXAMPLE

The ink jet recording head according to an embodiment of the present invention whose characteristic portion is shown in FIGS. 1 and 2 and whose essential portion is shown in FIG. 4 was made in the following manner.

A glass paste layer (GS-5, Kyocera Corporation) formed with a plurality of apertures in the form of windows was formed on a support member 1 of $Al_2O_3$ (an alumina smooth support A-491, Kyocera Corporation $35 \times 37 \times$ thickness 0.635) by the screen printing method and then after drying, a glaze layer 2 (thickness: 45 μm) is formed by calcifying at 1200° C. A heat accumulation layer 3 (thickness: 2.75 μm) of $SiO_2$ and a heat generating resistance layer 4 (thickness: 1500 Å) of $HfB_2$ were layered on the glaze layer 2 by the utilization of the RF sputtering method. Subsequently, a layer (thickness: 6000 Å) of Al electrode material was formed by the electron beam vapor deposition method (a first step).

Electrodes 5 of a predetermined pattern were formed by the photolithography technique, whereafter an ink protecting film (not shown) of $SiO_2$ was formed by the RF sputtering method, and a substrate 10 for an ink jet recording head according to the present embodiment was formed.

A wall member 11 was then provided on said substrate by the use of photoresist, and a cover member 12 was provided thereon by the use of photoresist, whereby liquid paths 7 and an ink path having a liquid chamber 8 were made. Finally, the end portions of the substrate 10, the wall member 11 and the cover member 12 were sectioned along a plane containing them to form ink discharge ports 6 which are the opening portions of the liquid paths 7 in the cross-section, whereby an ink jet recording head as shown in FIG. 4 was completed (a second steps).

COMPARATIVE EXAMPLE

An ink jet recording head was made in the same manner as the example except that the support member was a glass support member, an alumina support member having a glaze layer formed on the whole of one surface thereof or an alumina support member.

EVALUATION

Figure 6:
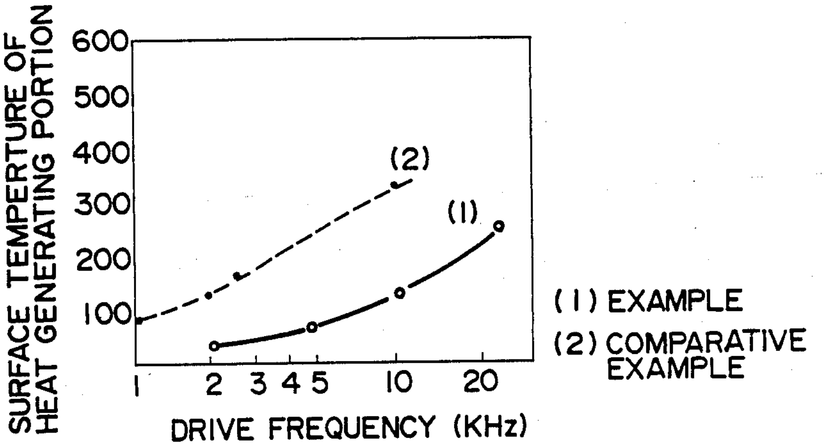
FIG. 6 is a graph showing the result of an experiment carried out with regard to the heat radiating property by the use of the substrate for the ink jet recording head according to an embodiment of the present invention and the substrate for the ink jet recording head according to a comparative example.

The substrates for the ink jet recording heads in the course of making of the ink jet recording heads of the example and each comparative example (after being made up to the first step) were formed separately from the head. They were driven at each driving frequency and the surface temperatures of the heat generating portions thereafter were measured when the driving pulse was not applied, in a state of equilibrium between the heat accumulation and the heat discharge, and the substantial heat radiating properties of the ink jet recording heads which were the finished products were examined. The result is shown in FIG. 6. The drive conditions were as follows:

the size of the heat generating portion: $20\times 100$ μm,
the driving voltage: 1.2 Vth,
the pulse width: 10 μs.

As shown in FIG. 6, in the substrate (1) for the ink jet recording head according to the present embodiment, as compared with the substrate (2) for the ink jet recording head according to the comparative example using a glass support member or an alumina support member having the glaze layer formed on the whole of one surface thereof, the heat radiating property was improved greatly and a necessary sufficient heat radiating property could be secured for the generally most frequently used frequency range of the order of 0–7 or 8 KHz.

As to the number of surface defects, estimation was made by examining the rate of production of defective products after the formation of the heat generating resistance layer. A hundred substrates each having eighty-seven heat generating portions are prepared for each example and comparative example, and the substrates having a wire break or a poor connection were estimated as unsuitable products.

With regard to the subtrate for the ink jet recording head of the comparative example using an alumina support member, the rate of production of defective products was about 80%, whereas with regard to the substrate for the ink jet recording head according to the present embodiment, it decreased greatly, namely, to about 0.4%.

As described above in detail, according to the present invention, there can be provided a substrate for an ink jet recording head, and an ink jet recording head which can cope with the elongation and bulkiness of the recording head while securing a sufficient heat radiating property necessary to maintain the quality of printing, and an ink jet recording apparatus provided with such ink jet recording head. Moreover, according to the present invention, there can be provided a substrate for an ink jet recording head and an ink jet recording head in which the occurrence of defects during the formation of the electrodes and heat generating resistance layer can be minimized. Ceramics or the like can be used for the support member and in addition, the yield can be made very high, and an ink jet recording apparatus can be provided with such ink jet recording head. Further, according to the present invention, there can be provided a substrate for an ink jet recording head and an ink jet recording head in which a mirror surface is formed by a glaze layer and therefore it is easy to recognize an alignment mark during patterning and the accuracy of alignment is good, and an ink jet recording apparatus provided with such ink jet recording head.

What is claimed is:

1. A substrate for an ink jet recording head comprising:
   - a support member;
   - an electro-thermal converter, disposed on said support member, having a heat generating resistive layer and a pair of electrodes connected to said heat generating resistive layer to form a heat generating portion between said electrodes; and
   - a glaze layer of glazing material disposed on said support member underneath said electro-thermal converter, wherein said glaze layer is omitted at said heat generating portion between said pair of electrodes.

2. A substrate according to claim 1, wherein said support member is ceramic material.

3. A substrate according to claim 2, wherein said ceramic material comprises at least one material selected from the group of $Al_2O_3$, SiC and AlN.

4. A substrate according to claim 1, wherein a heat accumulation layer is disposed between said glaze layer and said electro-thermal converter.

5. A substrate according to claim 4, wherein said heat accumulation layer is an inorganic oxide.

6. A substrate according to claim 5, wherein said inorganic oxide comprises $SiO_2$.

7. A substrate according to claim 1, wherein a heat accumulation layer is disposed between said glaze layer and said support member.

8. A substrate according to claim 7, wherein said heat accumulation layer is an inorganic oxide.

9. A substrate according to claim 8, wherein said inorganic oxide comprises $SiO_2$.

10. A substrate according to claim 1, wherein a protective layer is disposed on said electro-thermal converter.

11. A substrate according to claim 10, wherein said protective layer is $SiO_2$.

12. A substrate according to claim 1, further including a plurality of said heat generating portions, wherein said glaze layer is omitted from a band-like portion underneath said heat generating portions.

13. An ink jet recording head comprising:
   - a substrate for the ink jet recording head comprising a support member, an electro-thermal converter, disposed on said support member, having a heat generating resistive layer and a pair of electrodes connected to said heat generating resistive layer to form a heat-generating portion between said electrodes, and a glaze layer of glazing material disposed on said support member underneath said electro-thermal converter, wherein said glaze layer is omitted at said heat generating portion between said pair of electrodes; and
   - a member with a recess connected to said substrate to form an ink path communicating with a discharge port for discharging ink.

14. An ink jet recording head according to claim 13, wherein said support member is ceramic material.

15. An ink jet recording head according to claim 14, wherein said ceramic material comprises at least one material selected from the group $Al_2O_3$, SiC and AlN.

16. An ink jet recording head according to claim 13, wherein a heat accumulation layer is disposed between said glaze layer said electro-thermal converter.

17. An ink jet recording head according to claim 16, wherein said heat accumulation layer is an inorganic oxide.

18. An ink jet recording head according to claim 17, wherein said inorganic oxide comprises $SiO_2$.

19. An ink jet recording head according to claim 13, wherein a heat accumulation layer is disposed between said glaze layer and said support member.

20. An ink jet recording head according to claim 19, wherein said heat accumulation layer is an inorganic oxide.

21. An ink jet recording head according to claim 20, wherein said inorganic oxide comprises $SiO_2$.

22. An ink jet recording head according to claim 13, wherein a protective layer is disposed on said electro-thermal converter.

23. An ink jet recording head according to claim 22, wherein said protective layer is $SiO_2$.

24. An ink jet recording head according to claim 13, further including a plurality of said heat generating portions, wherein said glaze layer is omitted from a band-like portion underneath said heat generating portions.

25. An ink jet recording head according to claim 13, wherein said ink path includes a liquid path leading to said discharge port.

26. An ink jet recording head according to claim 13, wherein said ink path includes a liquid chamber for storing ink.

27. An ink jet recording head according to claim 13, wherein said ink path includes a plurality of liquid paths leading to corresponding discharge ports and a liquid chamber communicating with said liquid paths.

28. An ink jet recording head according to claim 13, wherein said head has a plurality of said discharge ports.

29. An ink jet recording head according to claim 13, wherein said member having a recess is a unitary member.

30. An ink jet recording head according to claim 13, wherein said member having a recess includes a wall member forming a wall for said ink path and a cover covering said wall member.

31. An ink jet recording head according to claim 13, wherein said member having a recess is formed by photosensitive material.

32. An ink jet recording head according to claim 31, wherein said photosensitive material comprises photosensitive resin.

33. An ink jet recording apparatus having an ink jet recording head comprising:

a substrate for the ink jet recording head comprising a support member, an electro-thermal converter, disposed on said support member, having a heat generating resistive layer and a pair of electrodes connected to said heat generating resistive layer to form a heat-generating portion between said electrodes, and a glaze layer of glazing material disposed on said support member underneath said electro-thermal converter, wherein said glaze layer is omitted at said heat generating portion between said pair of electrodes; and a member with a recess connected to said substrate to form an ink path communicating with a discharge port for discharging ink.

* * * * *

UNITED STATES PATENT AND TRADEMARK OFFICE
CERTIFICATE OF CORRECTION

PATENT NO. : 4,887,099
DATED : December 12, 1989
INVENTOR(S) : HARUHITO TERAI, ET AL.

It is certified that error appears in the above-identified patent and that said Letters Patent is hereby corrected as shown below:

COLUMN 1

Line 44, "in the manufac-" should be deleted.
Line 45, the line should read --40-50 μm and therefore, as in--.

COLUMN 3

Line 4, "the case" should read --the ease--.
Line 8, "improved radiation property" should read --improved heat radiation property--.

COLUMN 4

Line 61, "(a second steps)." should read --(a second step).--.

COLUMN 5

Line 4, the line should be deleted.
Line 38, "subtrate" should read --substrate--.

UNITED STATES PATENT AND TRADEMARK OFFICE
CERTIFICATE OF CORRECTION

PATENT NO. : 4,887,099

DATED : December 12, 1989

INVENTOR(S) : HARUHITO TERAI, ET AL.

It is certified that error appears in the above-identified patent and that said Letters Patent is hereby corrected as shown below:

COLUMN 6

Line 62, "group" should read --group of--.
Line 65, "layer said" should read --layer and said--.

Signed and Sealed this

Eighteenth Day of June, 1991

*Attest:*

HARRY F. MANBECK, JR.

*Attesting Officer*

*Commissioner of Patents and Trademarks*